United States Patent [19]
Yamao et al.

[11] Patent Number: 6,117,950
[45] Date of Patent: Sep. 12, 2000

[54] POLYARYLENE SULFIDE RESIN COMPOSITIONS

[75] Inventors: Shinobu Yamao; Wataru Kosaka, both of Sodegaura-machi, Japan

[73] Assignee: Idemitsu Petrochemical Company Limited, Tokyo, Japan

[21] Appl. No.: 09/412,987

[22] Filed: Oct. 6, 1999

Related U.S. Application Data

[62] Division of application No. 08/112,986, Aug. 30, 1993, Pat. No. 6,037,422, which is a continuation of application No. 07/821,304, Jan. 13, 1992, abandoned, which is a division of application No. 07/603,102, Oct. 25, 1990, abandoned.

[30] Foreign Application Priority Data

| Oct. 26, 1989 | [JP] | Japan | 1-279475 |
| Oct. 31, 1989 | [JP] | Japan | 1-284226 |
| Mar. 6, 1990 | [JP] | Japan | 2-54367 |
| Mar. 30, 1990 | [JP] | Japan | 2-83052 |
| Mar. 30, 1990 | [JP] | Japan | 2-83057 |

[51] Int. Cl.⁷ .................................................. C08F 283/00
[52] U.S. Cl. ...................................... 525/423; 525/420
[58] Field of Search ................... 525/420, 423, 525/537

[56] References Cited

U.S. PATENT DOCUMENTS

| 4,370,292 | 1/1983 | Yanase et al. | |
| 4,528,346 | 7/1985 | Sugie et al. | 525/423 |
| 4,699,975 | 10/1987 | Katto et al. | 575/537 |
| 4,760,109 | 7/1988 | Chiba. | |
| 4,917,957 | 4/1990 | Nitoh et al. | 428/447 |
| 5,015,704 | 5/1991 | Takekoshi et al. | 525/537 |

FOREIGN PATENT DOCUMENTS

| 1 272 826 | 8/1990 | Canada . |
| 0 044 136 A1 | 1/1982 | European Pat. Off. . |
| 0 104 543 | 4/1984 | European Pat. Off. . |
| 61207462 | of 0000 | Japan . |
| 53-69255 | 6/1978 | Japan . |
| 59-1422 | 1/1984 | Japan . |
| 59-51944 | 3/1984 | Japan . |
| 59-51945 | 3/1984 | Japan . |
| 59-113055 | 6/1984 | Japan . |
| 59-155462 | 9/1984 | Japan . |
| 60-8359 | 1/1985 | Japan . |
| 61-126170 | 6/1986 | Japan . |
| 61-207462 | 9/1986 | Japan . |
| 69832 | 3/1988 | Japan . |
| 63-146939 | 6/1988 | Japan . |
| 1-174562 | 7/1989 | Japan . |

*Primary Examiner*—Helen L. Pezzuto
*Attorney, Agent, or Firm*—Arent Fox Kintner Plotkin & Kahn PLLC

[57] ABSTRACT

A polyarylene sulfide resin composition contains a polyarylene sulfide containing at least one group selected from a group consisting of an amino group and an amide group, a polyamide resin, an epoxy resin and, as needed, a filler. A further composition contains 100 parts by weight of the polyarylene sulfide, 0.05 to 5 parts of the epoxy resin, and 5 to 400 parts of the filler. Another type of the resin composition contains the polyarylene sulfide, the polyamide, a compound selected from an acid, an acid anhydride and an acid halide, each having in its molecule not less than two functional groups reactive with the amino group or the amide group, and, as needed, the filler. A further type of the resin composition contains the polyarylene sulfide, the compound and, as needed, an inorganic filler subjected to surface treatment with a silane type coupling agent. A still further type of the resin composition contains the polyarylene sulfide and the compound. A still further type of the resin composition contains the polyarylene sulfide and the inorganic filler subjected to surface treatment with an epoxysilane type coupling agent.

9 Claims, No Drawings

POLYARYLENE SULFIDE RESIN COMPOSITIONS

This application is a divisional of application Ser. No. 08/112,986, filed Aug. 30, 1993, now U.S. Pat. No. 6,037,422, which is a continuation of application Ser. No. 07/821,304 filed Jan. 13, 1992, abandoned, which is a divisional of application Ser. No. 07/603,102, abandoned, filed on Oct. 25, 1990.

BACKGROUND OF THE INVENTION

1. Field of the Invention

The present invention relates to a polyarylene sulfide composition and, more particularly, to a polyarylene sulfide composition having improved mechanical properties such as impact resistance, bending strength and so on, while maintaining heat resistance and fire retardancy inherent in the polyarylene sulfide of the composition, which can be appropriately utilized in the mechanical, electrical and electronic fields.

2. Description of Related Art

Polyarylene sulfides (PAS), such as polyphenylene sulfide (homo-PPS), having excellent physical properties, such as heat resistance, fire retardancy, high rigidity and so on, have been extensively used in many fields as engineering plastics.

However, the polyarylene sulfide resins are so insufficient in impact resistance that a fibrous reinforcing material is generally blended in order to improve their impact strength, however, their impact strength cannot be said to reach a sufficient level for some uses.

Therefore, in order to further improve the impact strength of the polyarylene sulfide resins, it is known to blend an elastomer with the polyarylene sulfide resins. The resulting resin compositions are provided with improved impact strength yet their mechanical properties such as, for example, bending strength or heat resistance including heat distortion temperature may be reduced. Further, their solvent resistance may be reduced.

Furthermore, a blend of polyphenylene sulfide (homo-PPS) with an epoxy resin and glass fibers cannot yet be said to be sufficient from a standpoint of an improvement in impact strength.

Therefore, demands have been made to improve mechanical strength, particularly impact strength, of the polyarylene sulfide resin compositions of such a type without causing a substantial decrease in heat resistance.

On the other hand, the polyamide resins have the problems with water absorbency, although they have excellent characteristics, such as heat resistance, high rigidity and so on.

Attempts have so far been made to improve the properties inherent in both the polyarylene sulfide resin and the polyamide by making them a polymer alloy. Japanese Patent Examined Publication (kokoku) No. 1,422/1984 (Unexamined Publication (kokai) No. 69,255/1978) discloses a simple blend of a polyarylene sulfide and a polyamide. This resin composition, however, provides the problem that compatibility between the two resins is so insufficient that it cannot impart a sufficient improvement in its physical properties.

Japanese Patent Unexamined Publication (kokai) No. 155,462/1984 discloses a resin composition in which a poly-arylene sulfide is blended with an epoxy resin. This resin composition suffers from the problem that compatibility between the two resins is not yet sufficient because there is no site on the polyarylene sulfide on which it can react with the epoxy resin although the epoxy resin is added for the purpose of improving the compatibility of the polyarylene sulfide.

Further, Japanese Patent Unexamined Publication (kokai) No. 207,462/1986 discloses a resin composition containing a polyarylene sulfide having an amino group or an amide group, a thermoplastic elastomer, and an inorganic filler, to be added as needed. This resin composition, however, suffers from the disadvantages that, although its impact strength can be improved to a practically available level by adding the thermoplastic elastomer in the amount of 30% by weight, it cannot be said that it satisfies requirements for impact strength to a sufficient extent and further its heat distortion temperature is largely reduced down to approximately 250° C. and it becomes extremely poor in heat resistance.

On top of that, Japanese Patent Unexamined Publication (kokai) No. 51,944/1984 discloses a resin composition obtained by blending a polyphenylene sulfide with an epoxy resin; Japanese Patent Unexamined Publication (kokai) No. 51,945/1984 discloses a resin composition in which a polyphenylene sulfide is blended with a novolak-type epoxy resin; and Japanese Patent Unexamined Publication (kokai) No. 8,359/1985 discloses a resin composition resulting from a linear polyphenylene sulfide and an epoxy resin. These resin compositions, however, require comparatively large amounts of the epoxy resins to be added because the usual polyarylene sulfides have been used, and the effects of improvements in impact resistance and heat resistance cannot be said to be satisfactory.

Japanese Patent Unexamined Publication (kokai) No. 69,832/1985 discloses a thermoplastic resin composite material reinforced with fibers comprising 10% to 90% by weight of a polyphenylene sulfide, 90% to 10% by weight of a polyamide resin, and reinforced fibers having an average fiber length of 3 mm and longer.

Japanese Patent Unexamined Publication (kokai) No. 126,170/1986 discloses a polyamide resin composition comprising 50% to 5% by weight of a polyarylene sulfide and 95% to 50% by weight of nylon 46.

However, these resin compositions comprising simple blends have the problems that their mechanical strength may be reduced too much and the effect of improving impact strength may be less because of insufficient compatibility with each other.

Furthermore, Japanese Patent Unexamined Publication (kokai) No. 174,562/1989 discloses a polyphenylene sulfide resin composition comprising 1% to 99% by weight of a deionized polyphenylene sulfide and 1% to 99% by weight of a polyamide resin.

A further variant of polyphenylene sulfide resin compositions comprising a polyphenylene sulfide resin, a polyamide resin and an epoxy resin is disclosed in Japanese Patent Unexamined Publication (kokai) No. 146,939/1988.

These polyphenylene sulfide resin compositions have considerably improved properties by deionizing the polyphenylene or by adding the epoxy resin, in order to improve compatibility, however, the polyamide resin used has no reactivity with the polyphenylene sulfide resin so that stability may not be said to be satisfactory.

SUMMARY OF THE INVENTION

The present invention has been completed under the circumstances as have been described hereinabove.

The object of the present invention is to provide a novel polyarylene sulfide resin composition having improved mechanical properties, particularly improved impact resistance, without losing excellent fire retardancy and heat resistance inherent in a polyarylene sulfide and reducing heat distortion temperature.

A first preferred aspect of the present invention is a polyarylene sulfide resin composition characterized by containing a polyarylene sulfide having at least one substituent selected from a group consisting of an amino group and an amide group, a polyamide resin, and an epoxy resin.

A second preferred aspect of the present invention is a polyarylene sulfide resin composition characterized by containing a total of 100 parts by weight comprising 1% to 99% by weight of a polyarylene sulfide having at least one substituent selected from a group consisting of an amino group and an amide group and 99% to 1% by weight of the polyamide resin and 0.05 part to 10 parts by weight of the epoxy resin.

A third preferred aspect of the present invention is a polyarylene sulfide resin composition characterized by containing a total of 100 parts by weight consisting of 1% to 99% by weight of the polyarylene sulfide having at least one substituent selected from a group consisting of an amino group and an amide group and 99% to 1% by weight of the polyamide resin, 0.05 part to 10 parts by weight of the epoxy resin and 5 parts to 400 parts of a filler.

A fourth preferred aspect of the present invention is a polyarylene sulfide resin composition characterized by comprising 100 parts by weight of the polyarylene sulfide having at least one substituent selected from a group consisting of an amino group and an amide group, 0.05 part to 10 parts by weight of the epoxy resin and 5 parts to 400 parts of the filler.

A fifth preferred aspect of the present invention is a polyarylene sulfide resin composition characterized by comprising 100 parts by weight of the polyarylene sulfide having at least one substituent selected from a group consisting of an amino group and an amide group, 0.05 part to 10 parts by weight of the epoxy resin and 5 parts to 400 parts of glass fibers.

A sixth preferred aspect of the present invention is a polyarylene sulfide resin composition characterized by comprising 100 parts by weight of the polyarylene sulfide having at least one substituent selected from a group consisting of an amino group and an amide group, 0.05 part to 10 parts by weight of the epoxy resin and 5 parts to 400 parts of an inorganic filler treated with a silane-type coupling agent.

A seventh preferred aspect of the present invention is a polyarylene sulfide resin composition characterized by comprising the polyarylene sulfide having at least one substituent selected from a group consisting of an amino group and an amide group, the polyamide resin, and a compound having not less than two functional groups capable of reacting with the amino group or the amide group within one molecule thereof, which is selected from a group consisting of an acid, an acid anhydride and an acid halide.

An eighth preferred aspect of the present invention is a polyarylene sulfide resin composition characterized by comprising a total of 100 parts by weight consisting of 1% to 99% by weight of the polyarylene sulfide having at least one substituent selected from a group consisting of an amino group and an amide group and 99% to 1% by weight of the polyamide resin, and 0.01 parts to 5 parts by weight of a compound having not less than two functional groups capable of reacting with the amino group or the amide group within one molecule thereof, which is selected from a group consisting of the acid, the acid anhydride and the acid halide.

A ninth preferred aspect of the present invention is a polyarylene sulfide resin composition characterized by comprising the polyarylene sulfide having at least one substituent selected from a group consisting of an amino group and an amide group, the polyamide resin, the compound having not less than two functional groups capable of reacting with the amino group or the amide group within one molecule thereof, which is selected from a group consisting of the acid, the acid anhydride and the acid halide, and a filler.

A tenth preferred aspect of the present invention is a polyarylene sulfide resin composition characterized by comprising a total of 100 parts by weight consisting of 1% to 99% by weight of the polyarylene sulfide having at least one substituent selected from a group consisting of an amino group and an amide group and 99% to 1% by weight of the polyamide resin, 0.01 parts to 5 parts by weight of a compound having not less than two functional groups capable of reacting with the amino group or the amide group within one molecule thereof, which is selected from a group consisting of the acid, the acid anhydride and the acid halide, and 5 parts to 400 parts by weight of the filler.

An eleventh preferred aspect of the present invention is a polyarylene sulfide resin composition characterized by comprising the polyarylene sulfide having at least one substituent selected from a group consisting of an amino group and an amide group and a compound having not less than two functional groups capable of reacting with the amino group or the amide group within one molecule thereof, which is selected from a group consisting of an acid, an acid anhydride and an acid halide.

A twelfth preferred aspect of the present invention is a polyarylene sulfide resin composition characterized by comprising the polyarylene sulfide having at least one substituent selected from a group consisting of an amino group and an amide group, the compound having not less than two functional groups capable of reacting with the amino group or the amide group within one molecule thereof, which is selected from a group consisting of the acid, the acid anhydride and the acid halide, and the inorganic filler treated with the silane-type coupling agent having a functional group reactive with the compound.

A thirteenth preferred aspect of the present invention is a polyarylene sulfide resin composition characterized by comprising the polyarylene sulfide having at least one substituent selected from a group consisting of an amino group and an amide group and an inorganic filler treated with an epoxysilane-type coupling agent.

A fourteenth preferred aspect of the present invention is a polyarylene sulfide resin composition characterized by comprising the polyarylene sulfide having at least one substituent selected from a group consisting of an amino group and an amide group and 5% to 80% by weight of glass fibers treated with the epoxysilane-type coupling agent.

DESCRIPTION OF THE PREFERRED EMBODIMENTS

The present invention has been performed on the basis of the basic concept that mechanical properties such as, for example, impact strength, of the polyarylene sulfide are to be improved without suppressing physical properties with respect to thermal properties of the polyarylene sulfide.

In order to improve the mechanical properties of the polyarylene sulfide, it is necessary to provide a resin composition by admixing the polyarylene sulfide with a filler. A simple blend of the polyarylene sulfide with the filler, however, is so poor in adhesion of the filler to the polyarylene sulfide that the reinforcing effect to be expected by the addition of the filler cannot be achieved to a sufficient extent. Some resin composition obtainable by blending the polyarylene sulfide with the filler, such as an inorganic filler may have even gaps among the polyarylene sulfide and a surface of the filler. Such gaps may become the cause of centralizing stress, thereby reducing mechanical properties.

Accordingly, the present invention is so designed as to allow the polyarylene sulfide to come into contact with the filler to a sufficient degree or to chemically adhere to it, in blending the polyarylene sulfide with the filler.

More specifically, at least one functional group selected from a group consisting of an amino group and an amide group is incorporated into the polyarylene sulfide.

On the other hand, the filler is so modified as to have a functional group having an affinity with the amino group or the amide group or to have a functional group reactive with the amino group or the amide group. A combination of such a unique filler as modified hereinabove with such a unique polyarylene sulfide as having at least one group selected from a group consisting of the amino group and the amide group serves as improving compatibility of the filler with the polyarylene sulfide.

The fourteen preferred aspects of the present invention as described hereinabove has been made on the basis of the basic concept as described immediately hereinabove.

Another concept for the present invention may be based on a blend of such a unique resin or compound as having compatibility with both the polyarylene sulfide having the amino group or the amide group and the filler, when there is employed the filler which has conventionally been employed in the resin composition field yet which is not so modified in such a manner as described hereinabove, in other words, when the filler is employed without introduction of the functional group having compatibility with the amino group or the amide group.

It is also effective to use the polyarylene sulfide with the amino group or the amide group, the unique filler as well as such a unique resin or compound as described immediately hereinabove.

It is further to be noted that, even in instances where no inorganic filler is employed, the polyarylene sulfide with the amino group or the amide group may be blended with the particular resin or compound of low molecular weight, each having a group reactive with the amino group or the amide group, thereby improving mechanical properties of the resulting product.

The preferred aspects of the present invention has been proposed on the above concepts.

The present invention will be described more in detail.
Polyarylene Sulfides:

The significant point in the present invention resides in that the polyarylene sulfide to be used therefor is a polyarylene sulfide having at least one group selected from a group consisting of the amino group or the amide group (hereinafter will be referred to sometimes as a "functional-group containing polyarylene sulfide").

It is to be noted that the functional-group containing polyarylene sulfide to be used for the present invention may be a non-crosslinked or partially crosslinked polyarylene sulfide or a mixture thereof and a linear or branched polyarylene sulfide or a mixture thereof.

It is preferred to employ a polyarylene sulfide with a low degree of cross-link structures in order to further improve compatibility of the functional-group containing polyarylene sulfide with a polyamide resin in a blend.

It is further noted that the functional-group containing polyarylene sulfide to be employed for the present invention may be admixed with a linear or branched polyarylene sulfide homopolymer having neither amino group nor amide group.

The amount of the functional-group containing polyarylene sulfide in the mixture may be determined on the basis of the amount of the ingredient containing at least one group selected from a group consisting of the amino group and the amide group (the amount of a unit having either of these groups), the amount of an epoxy group contained in the polyarylene sulfide resin composition such as, for example, an epoxy resin, or the like, so that it is not restricted to a particular range. Generally, however, the amount of the polyarylene sulfide homopolymer may range from 0% to 99% by weight, preferably from 20% to 60% by weight, and the amount of the functional-group containing polyarylene sulfide may range from 1% to 100% by weight, preferably from 40% to 80% by weight. The rate of the ingredient containing the amino group and/or the amide group (the rate of a monomer unit containing the amino group and/or the amide group) may be in the range from 0.1% to 50% by mole.

The polyarylene sulfide containing neither amino group nor amide group may include, for example, a liner or branched homo-polyphenylene sulfide (PPS).

The polyarylene sulfide containing neither amino group nor amide group to be used for the present invention may have a melt index ranging usually from 10 grams to 10,000 grams per 10 minutes when measured by ASTM D-1238-74 (315.6° C.; load, 5 kg). When the polyarylene sulfide resin composition according to the present invention is to be injection molded, the functional-group containing polyarylene sulfide may have a melt index ranging usually from 10 grams to 10,000 grams per 10 minutes, preferably from 20 grams to 3,000 grams per 10 minutes, as measured by ASTM D-1238-74 (315.6° C.; load, 5 kg), and may contain a phenylene sulfide unit as represented by the following formula:

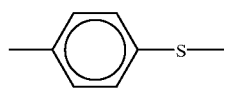

at the rate of 80% by mole or more, preferably 90% by mole.

If the rate of the phenylene sulfide unit would be less than 80% by mole, crystals of the functional-group containing polyarylene sulfide may become too bad and the resulting product may be provided with heat resistance to an insufficient extent.

It is further to be noted that the amino group and/or the amide group contained in the functional-group containing polyarylene sulfide to be used for the present invention may exist on its main polymer chain or its branched chain.

The amino group may be represented by the following general formula (I):

(I)

The amide group may be represented by the following general formula (II):

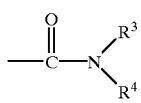
(II)

In the above formulas (I) and (II), $R^1$, $R^2$, $R^3$ and $R^4$ may be identical to or different from each other and stand for a hydrogen atom or an alkyl group.

The alkyl group as represented by $R^1$ to $R^4$, inclusive, may include a lower alkyl group such as, for example, methyl group, ethyl group, propyl group, butyl group, and so on.

In accordance with the present invention, in usual cases, the amino group is —$NH_2$ and the amide group is —$CONH_2$.

When the amino group and/or the amide group are/is joined to the phenylene group constituting the main polymer chain, the rate of the phenylene sulfide unit to which the amino group and/or the amide group are/is bonded may range preferably from 0.2% to 30% by mole, more preferably from 0.3% to 10% by mole.

In this case, it is to be understood that the rate of the phenylene sulfide unit is intended to mean a percentage by mole of the phenylene sulfide unit in the entire amount of the mixture of the copolymer containing the phenylene sulfide unit to which the amino group and/or the amide group are/is bonded with the polyarylene sulfide homopolymer (the polyarylene sulfide containing no function group).

If the rate of the phenylene sulfide unit exceeds 30% by mole, crystallinity of the polyphenylene sulfide itself may be reduced, thereby reducing physical properties such as heat resistance and so on. If the rate of the phenylene sulfide unit is less than 0.2% by mole, a sufficient degree of reaction with the epoxy resin may not occur when the epoxy resin is blended, so that physical properties of the resulting product may not be improved.

As the functional-group containing polyarylene sulfide copolymer as described hereinabove, there may be employed polyarylene sulfide copolymers of various molecular weights in accordance with uses, which have a melt index ranging usually from 10 grams to 10,000 grams per 10 minutes, preferably from 20 grams to 3,000 grams per 10 minutes, as measured by ASTM D-1238 74(315.6° C.; load., 5 kg).

The polyarylene sulfide containing at least one group selected from a group consisting of the amino group and the amide group may be prepared by various processes for copolymerizing comonomers containing the amino group and/or the amide group.

The comonomers may be incorporated by copolymerizing a chlorinated aniline such as monochloroaniline, dichloroaniline, N-alkyl-monochloroaniline, N-alkyl-dichloroaniline, etc., a chlorinated acetanilide such as chloroacetanilide, etc., a chlorinated benzamide such as dichlorobenzamide, etc., and so on.

The polymerization processes using the comonomer may include, for example:

(a) a process for copolymerizing p-dichlorobenzene with a comonomer containing at least one group selected from a group consisting of the amino group and the amide group in the presence of sulfur and sodium carbonate;

(b) a process for copolymerizing p-dichlorobenzene with the comonomer containing at least one group selected from a group consisting of the amino group and the amide group in the presence of sodium sulfide or sodium hydrosulfide and sodium hydroxide or hydrogen sulfide and sodium hydrosulfide in a polar solvent; and (c) a process for reacting p-dichlorobenzene with the comonomer containing at least one group selected from a group consisting of the amino group and the amide group in the presence of sodium sulfide in an amide type solvent such as N-methylpyrrolidone, dimethylacetamide or the like or in a sulfone type solvent such as sulphorane or the like.

In those processes, a polymerization promoter such as a carboxylic acid, an alkali metal salt of the carboxylic acid, an alkali metal halide such as lithium chloride, or the like, or an alkali hydrosulfide may be added in order to adjust the degree of polymerization.

By those processes as described hereinabove, the polyarylene sulfide containing at least one group selected from a group consisting of the amino group and the amide group serves as a copolymerization ingredient containing at least one group selected from a group consisting of the amino group and the amide group and provides polymers containing an an amino group-substituted phenylene sulfide linkage as represented by the following general formula:

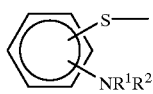

(wherein $R^1$ and $R^2$ have the same meanings as above), an amide group-substituted phenylene sulfide linkage as represented by the following general formula:

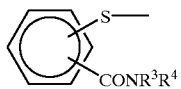

(wherein $R^3$ and $R^4$ have the same meanings as above), or various amino group-substituted arylene sulfide linkages, amide group-substituted arylene sulfide linkages, amino group-substituted alkylene sulfide linkages, amide group-substituted alkylene sulfide linkages, or the like.

It is also to be noted that the functional group-containing polyarylene sulfide to be used for the present invention may contain a copolymeric ingredient such as, for example:

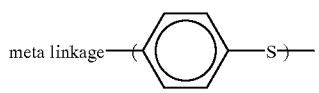
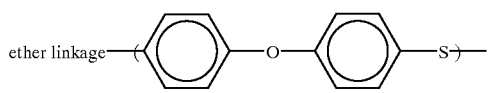
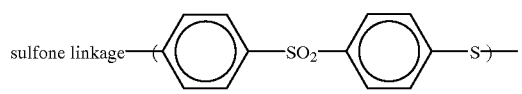
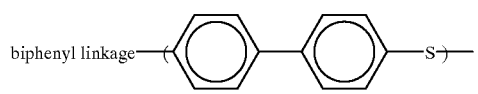

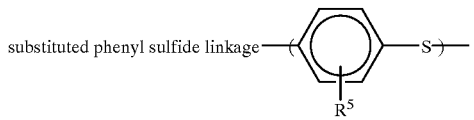

(wherein $R^5$ is an alkyl group, nitro group, a phenyl group, an alkoxy group, a residue of carboxylic acid or a metal salt of a carboxylic acid),

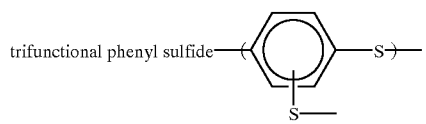

Further, it is to be noted that the functional group-containing polyarylene sulfide to be used for the present invention may be treated with an acid such as acetic acid with the attempt to improve compatibility with a polyamide resin when the polyarylene sulfide is blended with the polyamide resin.

Polyamide Resins:

In one aspect of the present invention, the polyarylene sulfide resin composition according to the present invention may contain the polyamide resin.

The polyamide resin to be used for the present invention may be a polyamide derived from an amino acid, a lactam, and a diamine and a dicarboxylic acid as a raw material.

The raw material may include, for example, lactam such as ε-caprolactam, enantholactam, ω-laurolactam, etc.; amino acid such as ε-aminocaproic acid, 11-aminoundecanoic acid, 12-aminododecanoic acid, etc.; diamine such as tetramethylene diamine, hexamethylene diamine, undecamethylene diamine, dodecamethylene diamine, 2,2,4-trimethylhexamethylene diamine, 5-methylnonamethylene diamine, m-xylene diamine, p-xylene diamine, 1,3-bisaminomethylcyclohexane, 1,4-bisaminomethylcyclohexane, bis-p-aminocyclohexylmethane, bis-p-aminocyclohexylpropane, isophorone diamine, etc.; dicarboxylic acid such as adipic acid, suberic acid, azelaic acid, sebacic acid, dodecane-dicarboxylic acid, cyclohexane-1,4-dicarboxylic acid, cyclohexane-1,3-dicarboxylic acid, terephthalic acid, isophthalic acid, naphthalene-dicarboxylic acid, dimer acid, etc., and so on.

These raw materials may be used singly or in the form of a mixture of two or more for polymerization, and the resulting polyamide homopolymers and copolymers may be used for the present invention.

In particular, the polyamides to be used for the present invention may include, for example, polycaproamide (nylon 6), polytetramethylene adipamide (nylon 46), polyhexamethylene adipamide (nylon 66), polyhexamethylene sebacamide (nylon 610), polyundecane amide (nylon 11), polydodecane amide (nylon 12), as well as a copolymer thereof and a mixture thereof. Among these polyamides, nylon 6, nylon 66, nylon 46 or a mixture thereof are more preferred.

The degree of polymerization of the polyamide to be used therein is not restricted to a particular range and the polyamide having the degree of polymerization ranging from 1.5 to 5.0 when measured as relative viscosity at 25° C. in a 1% conc. sulfuric acid aqueous solution may appropriately be employed.

Epoxy Resins:

In one preferred aspect of the present invention, the polyarylene sulfide resin composition according to the present invention contains the epoxy resin.

It is known that the epoxy resin is effective for increasing the melting viscosity of a particular polyphenylene sulfide (PPS) having a low degree of cross-linkage.

The epoxy resin to be used for the present invention is an epoxy resin having two or more epoxy groups.

The epoxy resin to be used for the present invention may be in a liquid form or in a solid form.

As specific examples of the epoxy resins may be mentioned a glycidyl ether of a bisphenol such as, for example, bisphenol A, resorcinol, hydroquinone, pyrocatechol, bisphenol F, saligenin, 1,3,5-trihydroxybenzene, bisphenol S, trihydroxydiphenyldimethylmethane, 4,4'-dihydroxybiphenyl, 1,5-dihydroxynaphthalene, caschewphenol, 2,2,5,5-tetraquis(4-hydroxyphenyl)-hexane, etc.; a glycidyl ether of a halogenated bisphenol in which the above bisphenol is replaced by the halogenated bisphenol; a glycidyl epoxy resin of a glycidyl ether type, such as a diglycidyl ether of a butane diol, of a glycidyl ester type such as glycidyl phthalate, of a glycidyl amine type, such as N-glycidylaniline, and so on; and a non-glycidyl epoxy resin of a linear type, such as an epoxylated polyolefin and epoxylated soy oil, and of a cyclic type such as vinylcyclohexene dioxide and dicyclopentadiene dioxide. Further, a novolak type epoxy resin and a halogen substitute thereof may also be mentioned.

Preferred is an epoxy resin containing two or more epoxy groups, for example, the novolak type epoxy resin and so on.

The novolak type epoxy resin usually has two or more epoxy groups and may be prepared by reacting a novolak type phenol resin with epichlorohydrin.

As phenols as a raw material therefor, there may be mentioned a phenol, o-cresol, m-cresol, bisphenol A, resorcinol, p-tert.-butylphenol, bisphenol S, bisphenol F or a mixture thereof.

Acid, Acid Anhydride and Acid Halide:

In an aspect of the polyarylene sulfide resin composition according to the present invention, there is employed a compound (hereinafter referred to merely as a particular compound) which is selected from an acid, an acid anhydride and an acid halide and which has in one molecule two or more functional groups reactive with the amino group or the amide group.

The functional group of the particular compound is not restricted to a specific kind as long as it can react with the amino group or the amide group of the functional group-containing polyarylene sulfide. Representatives of the functional groups may include, for example, —COOH, —COX (wherein X is a halogen atom), and —C(=O)OC(=O)— (an acid anhydride group).

It is of significance that the particular compound has at least two functional groups in its molecule.

One of at least two functional groups can react with the amino group and/or the amide group in the polyarylene sulfide, while the other one thereof can greatly contribute to appearance of wetting or adhesion to the polyamide or the filler.

The particular compound having the above functional group may be represented by the following general formula:

$$A-R^6-B$$

In this general formula, each of symbols A and B stand for —COOH, —COX or an acid anhydride group as represented by the formula:

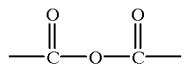

and the symbols A and B are identical to or different from each other. Symbol $R^6$ is an alkylene group or an aromatic carbohydryl group, and symbol X is a halogen atom.

Representatives of the particular compound as represented by the general formula may include, for example, a dicarboxylic acid as represented by the following general formula: HOOC—$R^7$—COOH (wherein $R^7$ stands for an alkylene group or an aromatic carbohydryl group) such as, for example, oxalic acid, malonic acid, succinic acid, glutaric acid, adipic acid, pimelic acid, suberic acid, azelaic acid, sebacic acid, 1,9-nonamethylene dicarboxylic acid, 1,10-decamethylene dicarboxylic acid, 1,11-undecamethylene dicarboxylic acid, 1,12-dodecamethylene dicarboxylic acid, 1,13-tridecamethylene dicarboxylic acid, 1,14-tetradecamethylene dicarboxylic acid, phthalic acid, isophthalic acid, terephthalic acid, etc.; a dicarboxylic acid halide as represented by the following general formula: XC(=O)—$R^8$—C(=O)X (wherein $R^8$ stands for an alkylene group or an aromatic carbohydryl group) such as, for example, phthaloyl chloride; and a dicarboxylic acid dianhydride as represented by the following general formula:

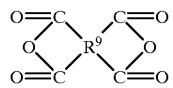

(wherein $R^9$ stands for an alkylene group or a divalent aromatic carbohydryl group) such as, for example, ethylene tetracarboxylic acid dianhydride, butane tetracarboxylic acid dianhydride, cyclopentane tetracarboxylic acid dianhydride, pyromellitic acid dianhydride, 3,3'4,4'-benzophenone tetracarboxylic acid dianhydride, 2,2',3,3'-benzophenone tetracarboxylic acid dianhydride, 3,3',4,4'-biphenyl tetracarboxylic acid dianhydride, 2,2',3,3'-biphenyl tetracarboxylic acid, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis (3,4-dicarboxyphenyl)sulfone dianhydride, 1,1-bis(2,3-dicarboxy-phenyl)ethane dianhydride, bis(2,3-dicarboxyphenyl)methane dianhydride, bis(3,4-dicarboxyphenyl)methane dianhydride, 4,4'-(p-phenylenedioxy)diphthalic acid dianhydride, 4,4'-(m-phenylenedioxy)diphthalic acid dianhydride, 2,3,6,7-naphthalene tetracarboxylic acid dianhydride, 1,4,5,8-naphthalene tetracarboxylic acid dianhydride, 1,2,5,6-naphthalene tetracarboxylic acid dianhydride, 1,2,3,4-benzene tetracarboxylic acid dianhydride, 3,4,9,10-perylene tetracarboxylic acid dianhydride, 2,3,6,7-anthracene tetracarboxylic acid dianhydride, 1,2,7,8-phenanthrene tetracarboxylic acid dianhydride, etc.

Among those various particular compounds, dicarboxylic acid dianhydride is preferred, and pyromellitic acid anhydride is particularly preferred.

These particular compounds may be employed singly or in combination of two or more.

Fillers:

The filler may include an inorganic filler and an organic filler.

As the inorganic filler, there may be mentioned, for example, fibrous inorganic filler, e.g., glass fibers (chopped strand, milled fibers), carbon fibers, metal fibers, fibrous potassium titanate, asbestos, whiskers such as silicon carbide, silicon nitride, etc., graphite, calcium carbonate, talc, mica, silica, boron nitride, barium sulfate, calcium sulfate, kaolin, clay, pyrophyllite, bentonite, sericite, zeolite, ferrite, attapulgite, wollastonite, calcium silicate, magnesium carbonate, dolomite, antimony trioxide, magnesium oxide, zinc oxide, titanium oxide, iron oxide, molybdenum disulfide, black lead, gypsum, glass flour, glass beads, quartz, quartz glass, metal flour such as iron, zinc, copper, aluminium, nickel, etc.

Among the inorganic fillers, the fibrous inorganic fillers are preferred, and glass fibers are particularly preferred.

When glass fibers are employed, an average fiber size is usually 20 microns or smaller, particularly preferably ranging from 5 to 14 microns. The aspect ratio may range usually from 5 to 500, preferably from 10 to 300.

As the glass fibers, either of glass fibers treated with a surface treating agent or those not treated therewith may be employed. The glass fibers treated with such a surface treating agent are more preferred.

As the surface treating agent, conventional surface treating agents may be employed, however, surface treating agents of an aminosilane type, of a block isocyanate type, of an epoxysilane type are particularly preferred, and those of the epoxysilane type are more preferred.

An epoxysilane type coupling agent to be used for treating surfaces of the inorganic filler may be represented by the following general formula:

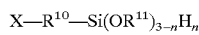

or

wherein X stands for an epoxy group;

$R^{10}$, $R^{11}$ and $R^{12}$ are identical to or different from each other and each stands for an alkyl group;

n stands for 0, 1 or 2; and

Y stands for a halogen atom.

In other words, the epoxysilane coupling agent to be used therefor may be an alkoxysilane or a halosilane having one or more epoxy groups in its molecule and may specifically include, for example, β-(3,4-epoxycyclohexyl)-ethyl trimethoxysilane, γ-glycidoxypropyl trimethoxysilane, γ-glycidoxypropyl methyl diethoxysilane, and so on.

These epoxysilane type coupling agents may be employed singly or in combination of two or more.

The surface treatment of the inorganic fillers with the epoxysilane type coupling agent may be carried out by immersing the inorganic fillers in the epoxysilane type coupling agent or a solution containing it or by spraying the inorganic fillers with the epoxysilane type coupling agent or the solution containing it and making the epoxysilane type coupling agent adhere to the surfaces of the inorganic fillers.

The various inorganic fillers as described hereinabove may be employed singly or in combination of two or more.

When not less than two inorganic fillers are used, it is preferred to use the fibrous inorganic filler in combination with another type of the inorganic filler or fillers. In this case, it is preferred to employ the fibrous inorganic filler, preferably glass fibers, at the rate of at least 5% by weight, preferably of 10% by weight or more, with respect to the total weight of the inorganic fillers.

It is further to be noted that the another type of the inorganic filler to be used together with the glass fibers is not necessarily treated with the surface treating agent.

The surface treatment of the inorganic fillers with the surface treating agent may be carried out by immersing the inorganic fillers in the surface treating agent or a solution containing it or by spraying the inorganic fillers with the surface treating agent or the solution containing it and making the surface treating agent adhere to the surfaces of the inorganic fillers.

The organic filler may include, for example, aramid fibers, super high molecular weight polyethylene powders and fibers, and so on.

Optional Ingredients:

Further, the polyarylene sulfide resin composition according to the present invention may additionally contain other resin as needed.

As these resins, there may be employed, for example, a homopolymer or copolymer of ethylene, butylene, pentene, butadiene, isoprene, chloroprene, styrene, α-methylstyrene, vinyl acetate, vinyl chloride, acrylic acid ester, (metha)-acrylonitrile, etc.; and a homopolymer, random copolymer, block copolymer and graft copolymer of polyurethane, polyacetal, polycarbonate, polysulfone, polyallylsulfone, polyether sulfone, polyallylate, polyphenylene oxide, polyether ether ketone, polyimide, silicone resin, phenoxy resin, fluorine resin, polyaryl ether, etc. A polyolefinic resin modified by an unsaturated carboxylic acid or its derivative may also be employed.

These resins may be used singly or in combination of two or more.

Amounts of each Ingredient:

(1) In one aspect of the present invention, the polyarylene sulfide resin composition contains the functional group-containing polyarylene sulfide, the polyamide resin, the epoxy resin and the filler to be blended as needed.

Although the rate at which the functional group-containing polyarylene sulfide is blended with the polyamide resin may vary with intended physical properties of the object product, the rate of the functional group-containing polyarylene sulfide may range generally from 1% to 99% by weight, preferably from 5% to 80% by weight, and the rate of the polyamide resin may range generally from 99% to 1% by weight, preferably from 95% to 20% by weight, respectively.

If each of the functional group-containing polyarylene sulfide and the polyamide resin would be less than 1% by weight, the effect intended to be achieved may be less than expected. More specifically, if the rate of the polyamide resin would become too small, on the one hand, no improvements in physical properties, particularly impact strength and toughness, may be achieved. If the rate of the functional group-containing polyarylene sulfide would become too small, on the other hand, water absorption of the resulting product may not be reduced to a sufficient extent.

The amount of the epoxy resin may range from 0.05 part to 10 parts by weight, preferably from 0.1 part to 5 parts by weight, with respect to 100 parts by weight of a total weight of the functional group-containing polyarylene sulfide and the polyamide resin.

If the amount of the epoxy resin would be less than 0.05 part by weight, on the one hand, the resulting polyarylene sulfide resin composition cannot achieve the effect to be expected to be gained by blending the epoxy resin. Hence, the compatibility between the functional group-containing polyarylene sulfide and the polyamide resin is so insufficient that the resulting composition cannot improve its physical properties to a sufficient extent.

If the amount of the epoxy resin would exceed 10 parts by weight, on the other hand, the effect cannot be achieved to such an extent as complying with an increase in the epoxy resin. Rather, there may be the risk that the resulting polyarylene sulfide resin composition decreases its molding performance due to an increase in viscosity, reduces its fire retardancy, and causes bleeding on the surface of a molded product.

It is preferred that the amount of the epoxy resin to be added as needed may appropriately be determined on the basis of the content of the amino group of the functional group-containing polyarylene sulfide and the epoxy equivalent of the epoxy resin.

More specifically, it is preferred that the epoxy resin is so added as to reach an amount which becomes equal to or somewhat smaller than a total amount of the amino groups in the functional group-containing polyarylene sulfide.

By blending the epoxy resin with the functional group-containing polyarylene sulfide, the resulting resin composition can stabilize its solution viscosity, adjust it with ease, and does not cause micropores to occur as shown in conventional oxidative cross-linked products.

The amount of the filler may range usually from 5 parts to 400 parts by weight, preferably from 20 to 300 parts by weight, with respect to 100 parts by weight of the total weight of the functional group-containing polyarylene sulfide and the polyamide resin.

If the amount of the filler would be less than 5 parts by weight, the addition of the filler does not improve the effect to a sufficient extent. If the amount of the filler would exceed 400 parts by weight, the resulting resin composition may reduce its kneading and molding properties.

(2) In another aspect of the present invention, the polyarylene sulfide resin composition contains 100 parts by weight of the functional group-containing polyarylene sulfide, 0.05 part to 5 parts by weight of the epoxy resin, and 5 parts to 400 parts by weight of the filler.

The amount of the epoxy resin may range from 0.05 part to 5 parts by weight, preferably from 0.1 part to 4 parts by weight, with respect to 100 parts by weight of the functional group-containing polyarylene sulfide.

If the amount of the epoxy resin would be less than 0.05 part by weight, on the one hand, the resulting polyarylene sulfide resin composition does not demonstrate improvements in physical properties, particularly Izod impact strength and bending strength, expected to be achieved by the addition of the epoxy resin.

If the epoxy resin would be blended in the amount exceeding 5 parts by weight, on the other hand, improvements in physical properties of the resulting product cannot be achieved particularly by an increase in the amount of the epoxy resin. Rather, the resulting polyarylene sulfide resin composition may incur the risk that molding properties are decreased due to elevation of viscosity, fire retardancy is reduced, and bleeding may be caused on the surface of a molded product.

It is preferred that the amount of the epoxy resin to be added as needed may appropriately be determined on the basis of the content of the amino group of the functional group-containing polyarylene sulfide and the epoxy equivalent of the epoxy resin.

More specifically, it is preferred that the epoxy resin is so added as to reach an amount which becomes equal to or somewhat smaller than a total amount of the amino groups in the functional group-containing polyarylene sulfide.

By blending the epoxy resin with the functional group-containing polyarylene sulfide, the resulting resin composition can stabilize its solution viscosity, adjust it with ease, and does not cause micropores to occur as shown in conventional oxidative cross-linked products. Further, the resulting resin composition possesses strength and bleeding performance higher than those of a composition resulting from blending the epoxy resin other than the novolak type epoxy resin.

The amount of the filler may range usually from 5 parts to 400 parts by weight, preferably from 10 to 300 parts by weight, with respect to 100 parts by weight of the functional group-containing polyarylene sulfide.

If the amount of the filler would be less than 5 parts by weight, the addition of the filler does not improve the effect to a sufficient extent. If the amount of the filler would exceed 400 parts by weight, the resulting resin composition may reduce its molding properties to a so low extent and its surface appearance becomes so poor that it is not practically applicable.

(3) In a further aspect of the present invention, the polyarylene sulfide resin composition contains the functional group-containing polyarylene sulfide, the polyamide resin, the compound selected from the acid, the acid anhydride and the acid halide, each having in its molecule not less than two functional groups reactive with the amino group or the amide group of the functional group-containing polyarylene sulfide, and the filler to be added as needed.

Although the rate at which the functional group-containing polyarylene sulfide is blended with the polyamide resin may vary with intended physical properties of the object product, the rate of the functional group-containing polyarylene sulfide may range generally from 1% to 99% by weight, preferably from 5% to 80% by weight, and the rate of the polyamide resin may range generally from 99% to 1% by weight, preferably from 95% to 20% by weight, respectively.

If each of the functional group-containing polyarylene sulfide and the polyamide resin would be less than 1% by weight, the effect intended to be achieved may be less than expected. Although have been described hereinabove, if the rate of the polyamide resin would become too small, on the one hand, no improvements in physical properties, particularly impact strength and toughness, may be achieved. If the rate of the functional group-containing polyarylene sulfide would become too small, on the other hand, water absorption of the resulting product may not be reduced to a sufficient extent.

The amount of the particular compound selected from the acid, the acid anhydride and the acid halide, each having in its molecule not less than two functional groups reactive with the amino group or the amidegroup of the functional group-containing polyarylene sulfide, may range from 0.01 part to 5 parts by weight, preferably from 0.05 part to 3 parts, with respect to 100 parts by weight of the total weight of the functional group-containing polyarylene sulfide and the polyamide resin.

If the amount of the particular compound would be less than 0.01 part by weight, on the one hand, the polyarylene sulfide resin composition containing the functional group-containing polyarylene sulfide and the particular compound may become poor in adhesion or wetting properties or may not demonstrate improvements in its mechanical strength. If the amount of the particular compound would exceed 5 parts by weight, on the other hand, the effect of the resulting resin composition may not be improved so as to agree with an increase in the amount of the particular compound.

The amount of the filler may range usually from 5 parts to 400 parts by weight, preferably from 20 to 300 parts by weight, with respect to 100 parts by weight of the total weight of the functional group-containing polyarylene sulfide and the polyamide resin.

When the amount of the filler is set within the range as specified as described hereinabove, the resulting polyarylene sulfide resin composition can improve its mechanical strength such as impact resistance, bending strength, and so on, without reducing its heat resistance and rigidity. If the amount of the filler would exceed 400 parts by weight, the resulting resin composition is lacking in the resin ingredient, thereby reducing kneading and molding properties. If the amount of the filler would become less than 5 parts by weight, the effect of improving heat resistance and of reinforcing the resulting resin composition may not be achieved.

(4) In a still further aspect of the present invention, the polyarylene sulfide resin composition contains the functional group-containing polyarylene sulfide, the compound selected from the acid, the acid anhydride and the acid halide, each having in its molecule not less than two functional groups reactive with the amino group or the amide group of the functional group-containing polyarylene sulfide, and the filler to be added as needed.

Although the rate at which the functional group-containing polyarylene sulfide is blended with the polyamide resin may vary with intended physical properties of the object product, the rate of the functional group-containing polyarylene sulfide may range generally from 1% to 99% by weight, preferably from 5% to 80% by weight, and the rate of the polyamide resin may range generally from 99% to 1% by weight, preferably from 95% to 20% by weight, respectively.

If each of the functional group-containing polyarylene sulfide and the polyamide resin would be less than 1% by weight, the effect intended to be achieved may be less than expected. Although have been described hereinabove, if the rate of the polyamide resin would become too small, on the one hand, no improvements in physical properties, particularly impact strength and toughness, may be achieved. If the rate of the functional group-containing polyarylene sulfide would become too small, on the other hand, water absorption of the resulting product may not be reduced to a sufficient extent.

The amount of the particular compound selected from the acid, the acid anhydride and the acid halide, each having in its molecule not less than two functional groups reactive with the amino group or the amide group of the functional group-containing polyarylene sulfide, may range from 0.01 part to 5 parts by weight, preferably from 0.05 part to 3 parts, with respect to the weight of the functional group-containing polyarylene sulfide or with respect to the total weight of the functional group-containing polyarylene sulfide and the homopolyarylene sulfide.

If the amount of the particular compound would be less than 0.01 part by weight, on the one hand, the polyarylene sulfide resin composition containing the functional group-containing polyarylene sulfide and the particular compound may become poor in adhesion or wetting properties. Further, when the resulting polyarylene sulfide resin composition contains the functional group-containing polyarylene sulfide, the particular compound, and the filler treated with the silane type coupling agent containing a functional group reactive with the particular compound may not demonstrate improvements in its mechanical strength. If the amount of the particular compound would exceed 5 parts by weight, on the other hand, the effect of the resulting resin composition may not be improved so as to agree with an increase in the amount of the particular compound.

The rate of the filler may range usually from 80% to 5% by weight, preferably from 70% to 10% by weight, with respect to the weight of the functional group-containing polyarylene sulfide or with respect to the total weight of the functional group-containing polyarylene sulfide, the homopolyarylene sulfide, the particular compound and the filler.

When the amount of the filler is set within the range as specified as described hereinabove, the resulting polyarylene sulfide resin composition can improve its mechanical strength such as impact resistance, bending strength, and so on, without reducing its heat resistance and rigidity. If the rate of the filler would exceed 80% by weight, the resulting resin composition is lacking in the resin ingredient, thereby reducing kneading and molding properties. If the rate of the filler would become less than 5% by weight, the effect of improving heat resistance and of reinforcing the resulting resin composition may not be achieved.

(5) In a still further aspect of the present invention, the polyarylene sulfide resin composition contains the functional group-containing polyarylene sulfide and the inorganic filler the surface of which is treated with the epoxysilane type coupling agent.

The rate of the functional group-containing polyarylene sulfide may range usually from 20% to 95% by weight, preferably from 30% to 90% by weight, with respect to the total weight of the functional group-containing polyarylene sulfide and the inorganic filler, and the rate of the inorganic filler may range usually from 80% to 5% by weight, preferably from 70% to 10% by weight, with respect to the total weight thereof.

When the rate of each of the ingredients is set within the range as specified hereinabove, the blend of the inorganic filler can further improve the mechanical properties of the resulting polyarylene sulfide resin composition.

If the rate of the functional group-containing polyarylene sulfide would be less than 20% by weight, on the one hand, the resulting polyarylene sulfide resin composition may reduce its kneading and molding properties. If the rate of the functional group-containing polyarylene sulfide would exceed 95% by weight, on the other hand, the resulting polyarylene sulfide resin composition can maintain its heat resistance and impact resistance to a favorable extent.

In either of the aspects of the present invention, it is preferred to set the optional ingredients at the rate of 30% by weight or less with the respect to the weight of the polyarylene sulfide resin composition.

Preparation of Resin Compositions:

The polyarylene sulfide resin compositions according to the present invention may be prepared by various known processes.

In preparing the polyarylene sulfide resin compositions, the order of blending each of the ingredients is not restricted to a particular one.

When the polyarylene sulfide resin composition containing the polyamide resin and the epoxy resin is prepared, the functional group-containing polyarylene sulfide, the polyamide resin, the epoxy resin and, as needed, the filler may be blended by various processes. In blending, it is not required that the amino group and/or the amide group present in the functional group-containing polyarylene sulfide is caused to react with the amide group of the polyamide resin or the epoxy group of the epoxy resin.

As the mixing means to be adopted for the preparation of the polyarylene sulfide resin composition according to the present invention, the mixing process is not restricted to a particular one and various mixing processes may be employed as long as they can provide a homogeneous mixture.

Specifically, the mixing may be carried out with a ribbon blender, a tumble mixer, a Henschel mixer, an oven roll, a Banbury mixer, a single screw extruder, a twin-screw extruder, a reciprocating single screw kneader or the like.

The polyarylene sulfide resin compositions prepared in the manner as described hereinabove may be molded or formed into various molded or formed products by various methods of molding or forming, such as injection molding, compression molding, extrusion and so on. They are also employed as various sealants and molding materials. For instance, the polyarylene sulfide resin compositions thus prepared may be molded or formed into flat plates, films, sheets and so on. Such a flat plate may be superposed on another flat plate into plywood or laminated bodies. They may also be formed into a multilayer film or sheet by coextrusion.

The polyarylene sulfide resin compositions according to the present invention may be molded or formed by the various molding or forming methods into molded or formed products to be useful in the mechanical, electrical, electronic and other fields, such as fibers, pipes, rods, films, sheets, bearings, and so on.

The present invention will be described in more detail by way of examples with reference to comparative examples.

EXAMPLE 1

Preparation of Amino Group-containing Polyphenylene Sulfide:

A reacting vessel with a stirrer were charged 833 moles of hydrous sodium sulfide ($Na_2S.5\ H_2O$) and 510 liters of N-methyl-2-pyrrolidone (NMP), and the mixture was subjected to dehydration under reduced pressures at 145° C. for 1 hour. Then the reaction system was cooled down to 45° C., and 833 moles of p-dichlorobenzene and 41.85 moles of dichloroaniline (DCA) (5% by mole) were added to the cooled reaction system. The resulting mixture was then reacted at 240° C. for 5 hours, and the reacting vessel was cooled. After the contents of the reacting vessel were filtered out, the resulting cake was washed three times with hot water, followed by washing once with NMP at 170° C., then three times with water and finally once with acetone. Thereafter, the resulting product was then dried at 185° C., thereby yielding 78 kg of amino group-containing polyphenylene sulfide (hereinafter referred to as DCA-PPS) in a white granular form.

The DCA-PPS was found to have the content of the amino group-containing unit at the rate of 5% by mole, a logarithmic viscosity number [$\eta_{inh}$] of 0.28, and a melt index of 29 grams per 10 minutes.

Preparation of Polyphenylene Sulfide Resin Composition:

In accordance with the composition rate (by parts by weight) of each of the ingredients as shown in Table 1 below, there were blended 50 parts by weight of the DCA-PPS as polyarylene sulfide containing an amino group and/or an amide group, 50 parts by weight of nylon 66 (UBE NYLON 66; Ube Kosan Kabushiki Kaisha) as a polyamide resin, and 1 part by weight of an epoxy resin of a cresol novolak type as an epoxy resin (ECN 1299; Ciba Geigy, Inc.), and the resulting mixture was molten and then extruded into pellets by a twin-screw extruder.

The pellets were then molded into test pieces by injection molding at the cylinder temperature of 320° C. and the mold temperature of 135° C. The test pieces were measured for Izod impact strength, bending strength, heat distortion temperature (HDT), and water absorption in accordance with the test methods as follows:

Izod impact strength: ASTM D256;

Bending strength: ASTM D790;

⅛ inche; span, 50 mm

Heat distortion temperature (HDT): ASTM D648, Load 18.5 kg/cm²

Water absorption: ASTM D570.

The results are shown in Table 1 below.

Comparative Example 1

The procedures were repeated in substantially the same manner as in Example 1, except for using a linear homopolyphenylene sulfide (hereinafter referred to as homo-PPS; logarithmic viscosity number $[\eta_{inh}]$ of 0.26; a MI of 59 grams per 10 minutes, as measured by ASTM D1238 74 (315.6° C.; load, 5 kg)) in place of the DCA-PPS. Pellets of the homo-PPS resin only were then prepared in the same manner as in Example 1 using neither polyamide resin nor epoxy resin, and they were measured for their physical properties in the same manner as in Example 1.

The results are shown in Table 1 below.

Comparative Example 2

The procedures were repeated in substantially the same manner as in Example 1, except for blending no epoxy resin.

The results are shown in Table 1 below.

Comparative Example 3

The procedures were repeated in substantially the same manner as in Comparative Example 1, except for blending glass fibers (FT 525; 13 microns diameter×3 mm, Asahi Fiber Glass K.K.) in the amount as shown in Table 1 below.

Comparative Examples 4 and 5

The procedures were repeated in substantially the same manner as in Comparative Example 3, except for blending nylon 66 in the amounts as shown in Table 1 below.

The results are shown in Table 1 below.

EXAMPLE 2

The procedures were repeated in substantially the same manner as in Example 1, except for blending nylon 46 in place of nylon 66.

The results are shown in Table 1 below.

EXAMPLES 3, 4 and 5

The procedures were repeated in substantially the same manner as in Example 1, except for blending glass fibers in the amounts as shown in Table 1 below.

The results are shown in Table 1 below.

EXAMPLES 6 and 7

The procedures were repeated in substantially the same manner as in Example 1, except for blending a mixture of the homo-PPS with the DCA-PPS as polyphenylene sulfide, nylon 46 as the polyamide resin, and the epoxy resin and glass fibers in the amounts as shown in Table 1 below. The physical properties of the resulting resin compositions were measured in the same manner as in Example 1.

The results are shown in Table 1 below.

EXAMPLE 8

Preparation of Amide Group-containing Polyphenylene Sulfide:

In the process for the preparation of the amino group-containing polyphenylene sulfide of Example 1, the procedures were repeated in substantially the same manner as in Example 1, except for using 41.85 moles of 2,5-dichlorobenzamide in place of dichloroaniline and carrying out the reaction at 230° C. for 5 hours, thereby yielding the amide group-containing polyphenylene sulfide.

The resulting amide group-containing polyphenylene sulfide was found to have the content of the amide group-containing unit at the rate of 5% by mole, a logarithmic viscosity number $[\eta_{inh}]$ of 0.28, and a melt index of 80 grams per 10 minutes.

Except for using polyphenylene sulfide having 5% by mole of the amide group-containing phenylene sulfide unit instead of the amino group-containing phenylene sulfide unit, the procedures of Example 7 were repeated.

The results are shown in Table 1 below.

TABLE 1

|  | Comp. Ex. 1 | Comp. Ex. 2 | Ex. 1 | Ex. 2 | Comp. Ex. 3 | Comp. Ex. 4 | Comp. Ex. 5 | Ex. 3 | Ex. 4 | Ex. 5 | Ex. 6 | Ex. 7 | Ex. 8 |
|---|---|---|---|---|---|---|---|---|---|---|---|---|---|
| Homo-PPS Note ① | 100 | 0 | 0 | 0 | 60 | 30 | 30 | 0 | 0 | 0 | 15 | 15 | 15 |
| DCA-PPS Note ② | 0 | 50 | 50 | 50 | 0 | 0 | 0 | 45 | 30 | 15 | 15 | 15 | 0 |
| DCBA-PPS Note ③ | 0 | 0 | 0 | 0 | 0 | 0 | 0 | 0 | 0 | 0 | 0 | 0 | 15 |
| Nylon 66 Note ④ | 0 | 50 | 50 | 0 | 0 | 30 | 30 | 15 | 30 | 45 | 0 | 0 | 0 |
| Nylon 46 Note ⑤ | 0 | 0 | 0 | 50 | 0 | 0 | 0 | 0 | 0 | 0 | 30 | 30 | 30 |
| GF(FT525) Note ⑥ | 0 | 0 | 0 | 0 | 40 | 40 | 40 | 40 | 40 | 40 | 40 | 40 | 40 |
| ECN 1299 Note ⑦ | 0 | 0 | 1 | 1 | 0 | 0 | 0 | 1 | 1 | 1 | 1 | 2 | 1 |
| Izod Strength (Unnotched) kgcm/cm² | 18 | 15 | 24 | 49 | 45 | 29 | 33 | 55 | 78 | 81 | 75 | 80 | 79 |
| Bending Strength kg/cm² | 960 | 1010 | 1200 | 1980 | 2300 | 1320 | 1410 | 2900 | 3100 | 3230 | 3080 | 3110 | 3090 |
| HDT (° C.) | 104 | 92 | 103 | 106 | 259 | 252 | 253 | 258 | 258 | 248 | 272 | 275 | 272 |
| Water Absorption (%) 24 hr. 23 | <0.01 | 0.5 | 0.03 | 0.04 | <0.01 | 0.09 | 0.09 | 0.03 | 0.04 | 0.06 | 0.04 | 0.03 | 0.02 |

* Parts by weight

Notes to Table 1:
① Homo-PPS: homo-polyphenylene sulfide
MI = 59 grams per 10 minutes
② DCA-PPS: amino group-containing polyphenylene sulfide; content of amino group-containing phenylene sulfide unit, 5% by mole;
MI = 29 grams per 10 minutes

TABLE 1-continued

| | Comp. Ex. 1 | Comp. Ex. 2 | Ex. 1 | Ex. 2 | Comp. Ex. 3 | Comp. Ex. 4 | Comp. Ex. 5 | Ex. 3 | Ex. 4 | Ex. 5 | Ex. 6 | Ex. 7 | Ex. 8 |
|---|---|---|---|---|---|---|---|---|---|---|---|---|---|

3) DCBA-PPS: amide group-containing polyphenylene sulfide; content of amide group-containing phenylene sulfide unit, 5% by mole; MI = 80 grams per 10 minutes
4) nylon 66: UBE NYLON 66; Ube Kosan K.K.
5) nylon 46: JSR TS 300; Nippon Gosei Gomu K.K.
6) GF: glass fibers; FT 525, 13 microns × 3 mm, Asahi Fiber Glass K.K.
7) ECN 1299: epoxy resin of cresol novolak type; Ciba Geigy, Inc.

Notes to Table 1:
1) Homo-PPS: homo-polyphenylene sulfide MI=59 grams per 10 minutes
2) DCA-PPS: amino group-containing polyphenylene sulfide; content of amino group-containing phenylene sulfide unit, 5% by mole; MI=29 grams per 10 minutes
3) DCBA-PPS: amide group-containing polyphenylene sulfide; content of amide group-containing phenylene sulfide unit, 5% by mole; MI=80 grams per 10 minutes
4) nylon 66: UBE NYLON 66; Ube Kosan K.K.
5) nylon 46: JSR TS 300; Nippon Gosei Gomu K.K.
6) GF: glass fibers; FT 525, 13 microns×3 mm, Asahi Fiber Glass K.K.
7) ECN 1299: epoxy resin of cresol novolak type; Ciba Geigy, Inc.

Evaluation:

As shown in Examples 6 and 7, the polyarylene sulfide resin compositions resulting from the mixture of the homopolyphenylene sulfide with the polyphenylene sulfide having an amino group with the polyamide resin, the epoxy resin of the cresol novolak type, and glass fibers demonstrate remarkably improved Izod impact strength and bending strength, as compared with the polyphenylene sulfide resin compositions resulting from the homo-PPS of Comparative Example 1, the amino group-containing polyphenylene sulfide of Example 1 only, the polyamide resin, and the epoxy resin. The heat distortion temperature (HDT) was elevated to 272° C. to 275° C., so that it was found that heat resistance has been improved.

Further, as shown in Examples 1, 2, 3 and 7, the blend of the epoxy resin can solve the problem with water absorption inherent in the polyamide resin.

As described hereinabove, the polyarylene sulfide resin composition according to the present invention comprises the polyarylene sulfide containing at least one functional group selected from a group consisting of the amino group and the amide group, the polyamide resin, the epoxy resin and the filler to be added as needed, so that the resulting polyarylene sulfide resin composition possesses improved mechanical properties, particularly impact resistance, and elevated heat distortion temperature, improved heat resistance and, further, high water repellency.

EXAMPLE 9

Preparation of Amino Group-containing Polyphenylene Sulfide:

A reacting vessel with a stirrer were charged 833 moles of hydrous sodium sulfide (Na$_2$S.5 H$_2$O) and 510 liters of N-methyl-2-pyrrolidone (NMP), and the mixture was subjected to dehydration under reduced pressures at 145° C. for 1 hour. Then the reaction system was cooled down to 45° C., and 833 moles of p-dichlorobenzene and 41.85 moles of dichloroaniline (DCA) (5% by mole) were added to the cooled reaction system. The resulting mixture was then reacted at 240° C. for 5 hours, and the reacting vessel was cooled. After the contents of the reacting vessel were filtered out, the resulting cake was washed three times with hot water, followed by washing once with NMP at 240° C., then three times with water and finally once with acetone. Thereafter, the resulting product was then dried at 185° C., thereby yielding 78 kg of amino group-containing polyphenylene sulfide (hereinafter referred to as DCA-PPS) in a white granular form.

The DCA-PPS was found to have the content of the amino group-containing unit at the rate of 5% by mole, a logarithmic viscosity number [$\eta_{inh}$] of 0.28, and a melt index of 29 grams per 10 minutes.

Preparation of Polyphenylene Sulfide Resin Composition:

There were blended 60 parts by weight of the DCA-PPS, 0.5 part by weight of epoxy resin of the cresol novolak type (ECN 1299; Ciba Geigy, Inc.) and 40 parts by weight of glass fibers (FT 525; 13 microns diameter×3 mm; Asahi Fiber Glass K.K.) subjected to surface treatment with 3-aminopropyltriethoxy-silane, and the resulting mixture was molten and then extruded into pellets by a twin-screw extruder.

The pellets were then molded into test pieces by injection molding at the cylinder temperature of 320° C. and the mold temperature of 135° C. The test pieces were measured for Izod impact strength, bending strength, and heat. distortion temperature (HDT) in the same manner as in Example 1. Further, Charpy impact strength was observed in accordance with JIS K-711.

The test results are shown in Table 2 below.

Furthermore, in order to evaluate fire retardancy of the test pieces, combustion test was carried out in accordance with "UL 94 (vertical condition)". And in order to evaluate solvent resistance, the test pieces were immersed in toluene for 24 hours and thereafter the state on the surface of the test pieces were visually observed.

The test results are shown in Table 3 below.

Comparative Example 6

The test pieces were prepared and measured for their physical properties in substantially the same manner as in Example 9, except for using no epoxy resin of the cresol novolak type.

The test results are shown in Tables 2 and 3 below.

EXAMPLES 10 and 11

The procedures were repeated in substantially the same manner as in Example 9, except for using the epoxy resin of the cresol novolak type in the amount as shown in Table 3 below.

The results are shown in Tables 2 and 3 below.

Comparative Example 7

The test pieces were prepared and measured for their physical properties in substantially the same manner as Comparative Example 6, except for using the homopolyphenylene sulfide (linear type; logarithmic viscosity number [$\eta_{inh}$], 0.26)) in place of DCA-PPS.

The test results are shown in Tables 2 and 3 below.

Comparative Examples 8 to 10

The procedures were repeated in substantially the same manner as in Comparative Example 6, except for blending the epoxy resin of the cresol novolak type in the amounts as shown in Table 2 below.

The results are shown in Tables 2 and 3 below.

EXAMPLE 12

The procedures were repeated in substantially the same manner as in Example 9, except for using an epoxy resin of a bisphenol A type (Epiclon 9056; Dainippon Ink & Chemical Ind. Co., Ltd.) in place of the epoxy resin of the cresol novolak type.

The results are shown in Tables 2 and 3 below.

EXAMPLE 13

The procedures were repeated in substantially the same manner as in Example 9, except for using glass fibers (FT525#2; 6 microns diameter×3 mm; Asahi Fiber Glass K.K.) subjected to surface treatment with 3-amino-propyl triethyoxysilane, in place of glass fibers (FT 525; 13 microns diameter×3 mm, Asahi Fiber Glass K.K.).

The results are shown in Tables 2 and 3 below.

EXAMPLE 14

The procedures were repeated in substantially the same manner as in Example 9, except for using glass 41.85 moles of 2,5-dichlorobenzamide, in place of dichloroaniline, and carrying out the reaction at 230° C. for 5 hours.

The resulting amido group-containing polyphenylene sulfide was found to have the content of the amide group-containing unit at the rate of 5% by mole, a logarithmic viscosity number [$\eta_{inh}$] of 0.28, and a melt index inh of 29 grams per 10 minutes.

The procedures were repeated in substantially the same manner as in Example 9 except for using the polyphenylene sulfide having the content of the amide group-containing phenylene sulfide unit in place of the amino group.

The results are shown in Tables 2 and 3.

EXAMPLES 15, 16 and 17

The procedures were repeated in substantially the same manner as in Example 9, except for using glass fibers (FT629; 13 microns diameter×3 mm; Asahi Fiber Glass K.K.) subjected to surface treatment with 3-glycidoxypropyl trimethoxysilane, as glass fibers and for using the epoxy resin in the amounts as shown in Table 3 below.

The results are shown in Tables 2 and 3 below.

TABLE 2

| | Ingredients | | | Izot Impact Strength | Izot Impact Strength | Bending | Heat Distortion Temp. | Charpy Impact |
|---|---|---|---|---|---|---|---|---|
| | Polyarylene Sulfide | Epoxy Resin Amount (Parts by Weight) | Filler | (Unnotched) (kg · cm/cm$^2$) | (Notched) (kg · cm/cm) | Strength (kg/cm$^2$) | (HDT) (° C.) | Strength (kg · cm/cm) |
| Ex. 9 | Note ① DCA-PPS | Note ④ Cresol Novolak | 0.5 | GF FT525 | Not Broken | 10.9 | 2900 | 263.7 | 10.3 |
| Ex. 11 | DCA-PPS | Cresol Novolak | 1.0 | " | Not Broken | 10.5 | 2800 | 265.4 | 10.7 |
| Ex. 12 | DCA-PPS | Cresol Novolak | 2.0 | " | Not Broken | 10.6 | 2700 | 264.2 | 10.6 |
| Ex. 13 | DCA-PPS | Note ⑤ Bisphenol A | 1.0 | " | 53.7 | 10.1 | 2440 | 265.2 | 10.0 |
| Ex. 14 | DCA-PPS | Cresol Novolak | 0.5 | GF FT525#2 | Not Broken | 9.8 | 3100 | 265.5 | 10.1 |
| Ex. 15 | Note ② Amide-PPS | Cresol Novolak | 0.5 | GF FT525 | Not Broken | 10.7 | 2870 | 265.0 | 10.4 |
| Ex. 15 | DCA-PPS | Cresol Novolak | 0.5 | GF FT629 | Not Broken | 10.0 | 2620 | 263.9 | 10.4 |
| Ex. 16 | DCA-PPS | Cresol Novolak | 1.0 | GF FT629 | Not Broken | 10.1 | 2820 | 264.2 | 9.7 |
| Ex. 17 | DCA-PPS | Cresol Novolak | 2.0 | GF FT629 | Not Broken | 10.8 | 2780 | 264.8 | 9.5 |
| Comp. Ex. 6 | DCA-PPS | — | | GF FT629 | 45.9 | 8.9 | 2380 | 264.5 | 9.6 |
| Comp. Ex. 7 | Note ③ Homo-PPS | — | | GF FT629 | 42.5 | 9.0 | 2290 | 259.0 | 9.8 |
| Comp. Ex. 8 | Homo-PPS | Cresol Novolak | 0.5 | GF FT629 | 51.3 | 10.4 | 2410 | 258.2 | 10.0 |
| Comp. Ex. 9 | Homo-PPS | Cresol Novolak | 1.0 | GF FT629 | 55.0 | 11.4 | 2460 | 257.3 | 11.3 |
| Comp. Ex. 10 | Homo- PPS | Cresol Novolak | 2.0 | GF FT629 | 56.1 | 10.3 | 2460 | 257.5 | 10.3 |

Notes to Table 2:
① DCA-PPS: amino group-containing polyphenylene sulfide; content of amino group-containing phenylene sulfide unit, 5% by mole; MI = 29 grams per 10 minutes
② DCBA-PPS: amide group-containing polyphenylene sulfide; content of amide group-containing phenylene sulfide unit, 5% by mole; MI = 80 grams per 10 minutes
③ Homo-PPS: homo-polyphenylene sulfide MI = 59 grams per 10 minutes
④ Cresol novolak: epoxy resin of cresol novolak type (ECN 1299; Ciba Geigy, Inc.); epoxy equivalent, 210–240 g/eq.
⑤ Bisphenol A: epoxy resin of bisphenol A type (Epiclon 9055; Dainippon Ink & Chemical Ind. Co., Ltd.); epoxy equivalent, 2,400–3,100 g/eq.

Notes to Table 2:
1) DCA-PPS: amino group-containing polyphenylene sulfide; content of amino group-containing phenylene sulfide unit, 5% by mole; MI=29 grams per 10 minutes
2) DCBA-PPS: amide group-containing polyphenylene sulfide; content of amide group-containing phenylene sulfide unit, 5% by mole; MI=80 grams per 10 minutes
3) Homo-PPS: homo-polyphenylene sulfide MI=59 grams per 10 minutes
4) Cresol novolak: epoxy resin of cresol novolak type (ECN 1299; Ciba Geigy, Inc.); epoxy equivalent, 210–240 g/eq.
5) Bisphenol A: epoxy resin of bisphenol A type (Epiclon 9055; Dainippon Ink & Chemical Ind. Co., Ltd.); epoxy equivalent, 2,400–3,100 g/eq.

TABLE 3

|  | Incombustibility | Solvent Resistance |
| --- | --- | --- |
| Example 9 | V-O | Good |
| Example 10 | ibid | ibid |
| Example 11 | ibid | ibid |
| Example 12 | ibid | ibid |
| Example 13 | ibid | ibid |
| Example 14 | ibid | ibid |
| Example 15 | ibid | ibid |
| Example 16 | ibid | ibid |
| Example 17 | ibid | ibid |
| Comp. Example 6 | ibid | ibid |
| Comp. Example 7 | ibid | ibid |
| Comp. Example 8 | ibid | ibid |
| Comp. Example 9 | ibid | ibid |
| Comp. Example 10 | ibid | ibid |

Evaluation:

It is apparent from the results of Table 2 above that the polyarylene sulfide resin compositions resulting from the amino group-containing polyphenylene sulfide, the epoxy resin of the cresol novolak type, and the glass fibers subjected to surface treatment with 3-aminopropyl triethoxysilane or 3-glycidoxypropyl trimethoxysilane, as prepared in Examples 9, 10, 11, 15, 16 and 17, demonstrate well balanced physical properties between Izod impact strength, bending strength, heat distortion temperature (HDT) and Charpy impact strength.

It is further to be noted that the polyarylene sulfide resin composition in one aspect of the present invention has its heat distortion temperature elevated to as high as 264° C. to 265° C., as compared with the heat distortion temperature as high as 259° C. for the homo-PPS, so that it is thus found that the heat resistance of the resulting resin composition has been improved.

It is also found that, as the polyphenylene sulfide resin composition according to the present invention prepared by the addition of the epoxy resin of the cresol novolak type as in the above examples has not been destroyed upon measurement for Izod impact strength, impact strength has been improved to a sufficient extent.

From Table 3, it has further been found that the polyarylene sulfide resin compositions according to the present invention are not adversely affected in terms of fire incombustibility and solvent resistance.

The polyarylene sulfide resin compositions in one aspect of the present invention comprises the polyarylene sulfide having at least one functional group selected from a group consisting of the amino group and/or the amide group, the epoxy resin, and the filler, so that they has an elevated heat distortion temperature and an improved balance of mechanical properties, particularly impact resistance, without adversely affecting the excellent fire incombustibility and solvent resistance inherent in the polyarylene sulfide.

EXAMPLE 18

Preparation of Amino Group-containing Polyphenylene Sulfide:

The amino group-containing polyphenylene sulfide (DCA-PPS) was prepared in the same manner as in Example 1.

Preparation of Polyphenylene Sulfide Resin Composition:

In accordance with the composition amount (parts by weight) of each ingredient as shown in Table 4 below, there were blended 50 parts by weight of the DCA-PPS as the polyarylene sulfide containing the amino group and/or the amide group, 50 parts by weight of nylon 66 (UBE NYLON 66; Ube Kosan K.K.), and 0.5 part by weight of pyromellitic acid anhydride, and the resulting mixture was molten and then extruded into pellets by a twin-screw extruder.

The pellets were then molded into test pieces by injection molding at the cylinder temperature of 320° C. and the mold temperature of 135° C. The test pieces were measured for Izod impact strength, bending strength, heat distortion. temperature (HDT) and water absorption.

The test results are shown in Table 4 below.

Comparative Example 11

The procedures were repeated in substantially the same manner as in Example 18, except for using only a linear homopolyphenylene sulfide (hereinafter referred to as homo-PPS; logarithmic viscosity number [$\eta_{inh}$] of 0.26; a MI of 59 grams per 10 minutes, as measured by ASTM D1238 74 (315.6° C.; load, 5 kg)) in place of the DCA-PPS.

Pellets of the homo-PPS resin only were then prepared in the same manner as in Example 18 using only the homo-PPS resin, and they were measured for their physical properties in the same manner as in Example 18.

The results are shown in Table 4 below.

Comparative Example 12

The procedures were repeated in substantially the same manner as in Example 1, except for blending no pyromellitic acid anhydride.

The results are shown in Table 4 below.

EXAMPLE 19

The procedures were repeated in substantially the same manner as in Example 18, except for using a mixture of the homo-PPS and the DCA-PPS as the polyphenylene sulfide, nylon 66 as the polyamide resin, and pyromellitic acid anhydride in accordance with the composition amounts as shown in Table 4 below.

The results are shown in Table 4 below.

EXAMPLES 20 and 21

The procedures were repeated in substantially the same manner as in Example 19, except for blending glass fibers.

In accordance with the composition rates as shown in Table 4 below, nylon 66 or nylon 46 were employed as the polyamide resin.

The results are shown in Table 4 below.

EXAMPLE 22

Preparation of Amide Group-containing Polyphenylene Sulfide:

The amide group-containing polyphenylene sulfide (DCA-PPS) was prepared in the same manner as in Example 8.

The procedures were repeated in substantially the same manner as in Example 21, except for using DCBA-PPS in place of the DCA-PPS.

The results are shown in Table 4 below.

Comparative Examples 13 and 14

The procedures were repeated in substantially the same manner as in Example 18, except for using the homo-PPS as the polyphenylene sulfide in accordance with the composition rates as shown in Table 4 below, without the addition of pyromellitic acid anhydride.

The results are shown in Table 4 below.

Comparative Example 15

The polyarylene sulfide resin composition having the composition as shown in Table 4 below was prepared and evaluated in the same manner as in Example 18.

The results are shown in Table 4 below.

As a comparison of Example 20 with Comparative Example 13 (a blend of the homo-PPS with glass fibers), it is found that impact strength has been increased from 45 kg.cm/cm$^2$ to 80 kg.cm/cm$^2$ and bending strength has also been increased from 2,300 kg/cm$^2$ to 3,100 kg/cm$^2$. Further, the heat distortion temperature has also been elevated from 259° C. to 271° C., so that it is found the heat resistance has been improved.

As is apparent from Comparative Example 15, the use of the homo-PPS only as the polyarylene sulfide and the addition of pyromellitic acid in the same manner as in the present invention present the improved effect, yet the effect is smaller as compared with the examples according to the present invention.

The polyarylene sulfide resin composition in one aspect of the present invention comprises the polyarylene sulfide having at least one functional group selected from a group consisting of the amino group and the amide group, the polyamide resin, the particular compound selected from the acid, the acid anhydride and the acid halide, each having in dts molecule not less than two functional groups reactive with the amino group or the amide group, and the filler. Thus, excellent heat resistance inherent in the polyarylene sulfide is not damaged, rather heat resistance is improved,

TABLE 4

|  | Comp. Ex. 11 | Comp. Ex. 12 | Comp. Ex. 13 | Comp. Ex. 14 | Comp. Ex. 15 | Ex. 18 | Ex. 19 | Ex. 20 | Ex. 21 | Ex. 22 |
|---|---|---|---|---|---|---|---|---|---|---|
| Homo-PPS | 100 | 0 | 60 | 30 | 30 | 0 | 25 | 15 | 15 | 15 |
| DCA-PPS | 0 | 50 | 0 | 0 | 0 | 50 | 25 | 15 | 15 | 0 |
| DCBA-PPS | 0 | 0 | 0 | 0 | 0 | 0 | 0 | 0 | 0 | 15 |
| Nylon 66 | 0 | 50 | 0 | 30 | 30 | 50 | 50 | 0 | 30 | 30 |
| Nylon 46 | 0 | 0 | 0 | 0 | 0 | 0 | 0 | 30 | 0 | 0 |
| GF | 0 | 0 | 40 | 40 | 40 | 0 | 0 | 40 | 40 | 40 |
| Pyromellitic Acid Anhydride | 0 | 0 | 0 | 0 | 1 | 0.5 | 1 | 1 | 1 | 1 |
| Izod Strength (Unnotched) kg · cm/cm$^2$ | 18 | 15 | 45 | 29 | 33 | 23 | 22 | 80 | 81 | 78 |
| Bending Strength kg/cm$^2$ | 960 | 1010 | 2300 | 1320 | 1410 | 1180 | 1200 | 3100 | 3080 | 3120 |
| HDT (° C.) | 104 | 92 | 259 | 252 | 253 | 102 | 103 | 271 | 255 | 256 |
| Water Absorption (%) 24 hrs, in water 23° C. | <0.01 | 0.5 | <0.01 | 0.09 | 0.09 | 0.02 | 0.02 | 0.03 | 0.03 | 0.02 |

Note:
Parts by weight
Notes to Table 4:
1) Homo-PPS: homo-polyphenylene sulfide
MI = 59 grams per 10 minutes
2) DCA-PPS: amino group-containing polyphenylene sulfide; content of amino group-containing phenylene sulfide unit, 5% by mole;
MI = 29 grams per 10 minutes
3) DCBA-PPS: amide group-containing polyphenylene sulfide; content of amide group-containing phenylene sulfide unit, 5% by mole;
MI = 80 grams per 10 minutes
4) nylon 66: UBE NYLON 66; Ube Kosan K.K.
5) nylon 46: JSR TS 300; Nippon Gosei Gomu K.K.
6) GF: glass fibers; FT 525, 13 microns × 3 mm, Asahi Fiber Glass K.K.
7) Pyromellitic acid: commercially available reagent Evaluation:

Example 18 is directed to the polyarylene sulfide resin composition comprising the mixture of the homo-polyphenylene sulfide with the polyphenylene sulfide containing the amino group, the polyamide resin, and pyromellitic acid anhydride. Example 20 is directed to the polyarylene sulfide resin composition in which glass fibers are further added to the composition of Example 18. These resin compositions have improved Izod strength and bending strength. Further, it is found that their heat distortion temperatures (HDT) are elevated and their heat resistance are improved.

and toughness is improved by the addition of the polyamide resin, so that the resulting polyarylene sulfide resin composition has improved mechanical properties, particularly impact strength, and water absorption.

Therefore, molded or formed products prepared by molding or forming the polyarylene sulfide resin composition by injection molding or other molding or forming procedures can make significant contribution to the industrial field such as mechanical, electrical, electronic fields and so on.

EXAMPLE 23
Preparation of Amino Group-containing Polyphenylene Sulfide:

A reacting vessel with a stirrer were charged 833 moles of hydrous sodium sulfide ($Na_2S.5\ H_2O$) and 510 liters of N-methyl-2-pyrrolidone (NMP), and the mixture was subjected to dehydration under reduced pressures at 145° C. for 1 hour. Then the reaction system was cooled down to 45° C., and 833 moles of p-dichlorobenzene and 41.85 moles of dichloroaniline (DCA) (5% by mole) were added to the cooled reaction system. The resulting mixture was then reacted at 240° C. for 5 hours, and the reacting vessel was cooled. After the contents of the reacting vessel were filtered out, the resulting cake was washed three times with hot water, followed by washing once with NMP at 170° C., then three times with water and finally once with acetone. Thereafter, the resulting product was then dried at 185° C., thereby yielding 78 kg of amino group-containing polyphenylene sulfide (hereinafter referred to as DCA-PPS) in a white granular form.

The DCA-PPS was found to have the content of the amino group-containing unit at the rate of 5% by mole, a logarithmic viscosity number [$\eta_{inh}$] of 0.28, and a melt index of 29 grams per 10 minutes.

Preparation of Polyphenylene Sulfide Resin Composition:

There were blended 720 grams of the DCA-PPS, pyromellitic acid anhydride so added as to reach 0.17% per the resin weight, glass fibers (CSO3MAFT525; 13 microns diameter×3 mm; Asahi Fiber Glass K.K.) subjected to surface treatment with 3-aminopropyltriethoxysilane so added as to reach 40% by weight, and the resulting mixture was molten and then extruded into pellets by a twin-screw extruder.

The pellets were then molded into test pieces by injection molding at the cylinder temperature of 320° C. and the mold temperature of 135° C. The test pieces were measured for Izod impact strength, bending strength, heat distortion temperature (HDT), and Charpy impact strength.

The test results are shown in Table 5 below.

It is noted that the polyarylene sulfide resin composition prepared separately by melting a blend of the DCA-PPS with pyromellitic acid anhydride can achieve the similar effect even if glass fibers have been added thereto.

EXAMPLE 24

The test pieces were prepared and measured for their physical properties in substantially the same manner as in Example 23, except for using pyromellitic acid at the rate of 0.33% by weight.

The test results are shown in Table 5 below.

EXAMPLE 25

The test pieces were prepared and measured for their physical properties in substantially the same manner as in Example 23, except for using pyromellitic acid at the rate of 0.5% by weight.

The test results are shown in Table 5 below.

Comparative Example 16

The test pieces were prepared and measured for their physical properties in substantially the same manner as in Example 23, except for using no pyromellitic acid anhydride.

The test results are shown in Table 5 below.

Comparative Example 17

The test pieces were prepared and measured for their physical properties in substantially the same manner as in Comparative Example 16, except for using the homopolyphenylene sulfide (linear type; logarithmic viscosity number [$\eta_{inh}$], 0.26)), in place of the DCA-PPS.

The test results are shown in Table 5 below.

EXAMPLE 26
Preparation of Amide Group-containing Polyphenylene Sulfide:

The procedures were repeated in substantially the same manner as in Example 23, except for using 41.85 moles of 2,5-dichlorobenzamide, in place of dichloroaniline and carrying out the reaction at 230° C. for 5 hours.

The resulting amide group-containing polyphenylene sulfide was found to have the content of the amide group-containing unit at the rate of 5% by mole, a logarithmic viscosity number [$\eta_{inh}$] of 0.28, and a melt index of 80 grams per 10 minutes.

Preparation of Polyphenylene Sulfide Resin Composition:

The test pieces were prepared and measured for their physical properties in substantially the same manner as in Example 23, except for using the amide group-containing polyphenylene sulfide.

The results are shown in Table 5 below.

As a result of electronic microscopic observation on broken surfaces of molded products obtained in the examples of the present invention and the comparative examples, it was apparently found that adhesion between the resin and the glass fibers was recognized.

TABLE 5

|  | Izod Impact Strength Unnotched (kg · cm/cm²) | Izod Impact Strength Notched (kg · cm/cm) | Bending Strength | Heat Distortion Temp. (HDT) (° C.) | Charpy Impact Strength (kg · cm/cm²) |
| --- | --- | --- | --- | --- | --- |
| Ex. 23 | 70.3 | 12.0 | 2,610 | 257 | 12.0 |
| Ex. 24 | 73.0 | 12.0 | 2,760 | 262 | 11.5 |
| Ex. 25 | 73.0 | 11.9 | 2,540 | 261 | 11.6 |
| Comp. Ex. 16 | 46.7 | 8.9 | 2,370 | 258 | 9.3 |
| Comp. Ex. 17 | 46.7 | 8.5 | 2,370 | 258 | 9.0 |
| Ex. 26 | 70.0 | 11.5 | 2,700 | 262 | 11.4 |

The polyarylene sulfide resin composition in one aspect of the present invention comprises the polyarylene sulfide containing at least one functional group selected from a group consisting of the amino group and the amide group, and the particular compound selected from the acid, the acid anhydride and the acid halide, each having in its molecule not less than two functional groups reactive with the amino group or the amide group. This polyarylene sulfide resin composition can provide good adhesion to and wetting performance against an object to be combined with the polyarylene sulfide resin composition.

Therefore, for instance, the polyarylene sulfide resin composition can form various composite materials in combination with various members, such as plywood, the polyarylene sulfide resin composition containing fillers, and so on.

The polyarylene sulfide resin composition in one aspect of the present invention comprises the polyarylene sulfide containing at least one functional group selected from a group consisting of the amino group and the amide group, the particular compound selected from the acid, the acid anhydride and the acid halide, each having in its molecule not less than two functional groups reactive with the amino group or the amide group, and the inorganic filler subjected to surface treatment with the silane type coupling agent having a functional group reactive the particular compound. This polyarylene sulfide resin composition can improve good adhesion and wetting performance between the resin and the inorganic filler. As a result, the resulting polyarylene sulfide resin composition can improve mechanical properties to a great extent without damaging the heat distortion temperature and fire incombustibility inherent in the polyarylene sulfide.

Therefore, molded or formed products prepared by molding or forming the polyarylene sulfide resin composition by injection molding or other molding or forming procedures can make significant contribution to the industrial field such as mechanical, electrical, electronic fields and so on.

EXAMPLE 27

Preparation of Amino Group-containing Polyphenylene Sulfide:

The amino group-containing polyphenylene sulfide (DCA-PPS) was prepared in the same manner as in Example 1.

Preparation of Polyphenylene Sulfide Resin Composition:

The DCA-PPS and glass fibers (03MAFT629; 13 mm diameter×3 mm;Asahi Fiber Glass K.K.) subjected to surface treatment with 3-glycidoxypropyl trimethoxysilane were blended so as to contain the glass fibers at the rate of 40% by weight, and the mixture was blended in a molten state and extruded into pellets with a twin-screw extruder.

The pellets were then molded into test pieces by injection molding at the cylinder temperature of 320° C. and the mold temperature of 135° C. The test pieces were measured for Izod impact strength (unnotched), bending strength, and heat distortion temperature (HDT).

The test results are shown in Table 6 below.

Comparative Example 18

The test pieces were prepared and measured for their physical properties in substantially the same manner as in Example 27, except for using polyphenylene sulfide with neither amino group nor amide group [Home-PPS ($\eta_{inh}$: 0.305)], in place of the DCA-PPS.

The results are shown in Table 6 below.

EXAMPLE 28

The test pieces were prepared and measured for their physical properties in substantially the same manner as in Example 27, except for using the DCA-PPS with the amino group content of 5% by mole, in place of the DCA-PPS of Example 27

The results are shown in Table 6 below.

Comparative Example 19

The test pieces were prepared and measured for their physical properties in substantially the same manner as in Example 28, except for using glass fibers subjected to surface treatment with aminosilane, in place of the treated glass fibers of Example 28.

The results are shown in Table 6 below.

EXAMPLE 29

The test pieces were prepared and measured for their physical properties in substantially the same manner as in Example 28, except for using glass fibers so added as to reach 50% by weight.

The results are shown in Table 6 below.

Comparative Example 20

The test pieces were prepared and measured for their physical properties in substantially the same manner as in Comparative Example 18, except for using glass fibers so added as to reach 50% by weight. The results are shown in Table 6 below.

EXAMPLE 30

Preparation of Amide Group-containing Polyphenylene Sulfide:

The amide group-containing polyphenylene sulfide having the same properties as prepared in Example 8 was prepared in substantially the same manner as in Example 8.

Thereafter, test pieces were prepared and measured for physical properties in the same manner as in Example 28.

The test results are shown in Table 6 below.

As a result of measurement by electronic microscopy, it was found that there was an obvious difference on adhesion of the resin to glass fibers between broken surfaces of the products molded or formed from the examples and comparative examples.

TABLE 6

|  | Izod Impact Strength (unnotched) (kg · cm/cm$^2$) | Bending Strength (kg/cm$^2$) | Heat Distortion Temp. (HDT) (° C.) |
| --- | --- | --- | --- |
| Example 27 | 53 | 2,490 | 262 |
| Comparative Example 18 | 50 | 2,360 | 258 |
| Example 28 | 57 | 2,540 | 263 |
| Comparative Example 19 | 47 | 2,370 | 258 |
| Example 29 | 46 | 2,700 | 269 |
| Comparative Example 20 | 38 | 2,400 | 265 |
| Example 30 | 56 | 2,520 | 263 |

The polyarylene sulfide resin composition in one aspect of the present invention comprises the polyarylene sulfide containing the particular functional group, and glass fibers subjected to surface treatment with the epoxysilane type coupling agent, so that wetting performance between the resin and inorganic fillers is improved and fire imcombustibility and rigidity are maintained, thereby improving mechanical strength such as heat resistance, impact strength, bending strength, etc.

Therefore, molded or formed products prepared by molding or forming the polyarylene sulfide resin composition by injection molding or other molding or forming procedures can make significant contribution to the industrial field such as mechanical, electrical, electronic fields and so on.

What is claimed is:

1. A resin composition comprising: (A) a polyarylene sulfide having at least one member selected from the group consisting of an amino group and an amide group pendant therefrom; and (B) at least one member selected from the group consisting of (B') an epoxy resin, and (B") a compound, selected from the group consisting of an acid, an acid anhydride, and an acid halide, having in its molecule not less than two functional groups reactive with said pendant amino or amide groups, wherein a thermoplastic elastomer resin is excluded from the resin composition.

2. A resin composition as claimed in claim 1 further including (C) at least one polyamide resin.

3. A resin composition as claimed in claim 1 further including (D) an inorganic filler.

4. A resin composition as claimed in claim 3, wherein said filler has been surface treated with a silane coupling agent.

5. A resin composition as claimed in claim 3 wherein said component (B) is an epoxy resin (B').

6. A resin composition as claimed in claim 3 wherein said component (B) is a compound (B") and wherein said filler has been subjected to a surface treatment with a silane coupling agent having at least one functional group which is reactive with said compounds.

7. A resin composition as claimed in claim 1 wherein said component (B) is a compound selected from the group consisting of: oxalic acid, malonic acid, succinic acid, glutaric acid, adipic acid, pimelic acid, suberic acid, azelaic acid, sebacic acid, 1,9-nonamethylene dicarboxylic acid, 1,10-decamethylene dicarboxylic acid, 1,11-undecamethylene dicarboxylic acid, 1,12-dodecamethylene dicarboxylic acid, 1-13-tridecamethylene dicarboxylic acid, 1,14-tetradecamethylene dicarboxylic acid, phthalic acid, isopthalic acid, terepthalic acid, phthaloyl chloride, ethylene tetracarboxylic acid dianhydride, butane tetracarboxylic acid dianhydride, cyclopentane tetracarboxylic acid dianhydride, pyromellitic acid dianhydride, 2,2',3,3'-benzophenone tetracarboxylic acid dianhydride, 3,3',4,4'-benzophenone tetracarboxylic acid dianhydride, 3,3',4,4'-biphenyl tetracarboxylic acid dianhydride, 2,2',3,3'-biphenyl tetracarboxylic acid, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(3,4-dicarboxyphenyl)sulfone dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)dipthalic acid dianhydride, 4,4'-(m-phenylenedioxy)dipthalic acid dianhydride, 2,3,6,7-napthalene tetracarboxylic acid dianhydride, 1,4,5,8-napthalene tetracarboxylic acid dianhydride, 1,2,5,6-napthalene tetracarboxylic acid dianhydride, 1,2,3,4-benzene tetracarboxylic acid dianhydride, 3,4,9,10-perylene tetracarboxylic acid dianhydride, 2,3,6,7-anthracene tetracarboxylic acid dianhydride, 1,2,7,8-phenanthrene tetracarboxylic acid dianhydride.

8. A resin composition comprising:

(A) a polyarylene sulfide having at least one member selected from the group consisting of an amino and an amide group pendant therefrom, (B') an epoxy resin, and (B") a compound, selected from the group consisting of an acid, an acid anhydride, and an acid halide, having in its molecule not less than two functional groups reactive with said pendant amino or amide groups.

9. A resin composition according to claim 8, wherein said epoxy resin (B') contains two or more epoxy groups.

* * * * *